US012485453B2

(12) United States Patent
Donohue et al.

(10) Patent No.: US 12,485,453 B2
(45) Date of Patent: Dec. 2, 2025

(54) END STRIPPER FOR FLEXIBLE SCREEN FRAME MATERIAL

(71) Applicant: Erdman Automation Corporation, Princeton, MN (US)

(72) Inventors: Morgan Donohue, North Oaks, MN (US); Peter Kroll, Saint Stephen, MN (US); Andrew D. Peterson, Zimmerman, MN (US)

(73) Assignee: Erdman Automation Corporation, Princeton, MN (US)

( * ) Notice: Subject to any disclaimer, the term of this patent is extended or adjusted under 35 U.S.C. 154(b) by 52 days.

(21) Appl. No.: 18/629,480

(22) Filed: Apr. 8, 2024

(65) Prior Publication Data

US 2025/0312827 A1 Oct. 9, 2025

(51) Int. Cl.

| | |
|---|---|
| ***B08B 1/16*** | (2024.01) |
| ***A47L 4/04*** | (2006.01) |
| ***B08B 1/30*** | (2024.01) |
| ***B08B 7/00*** | (2006.01) |

(52) U.S. Cl.
CPC ................ *B08B 1/165* (2024.01); *A47L 4/04* (2013.01); *B08B 1/30* (2024.01); *B08B 7/0071* (2013.01); *B08B 2220/04* (2013.01)

(58) Field of Classification Search
CPC ......... B08B 1/165; B08B 1/30; B08B 7/0071; B08B 2220/04; A47L 4/04
See application file for complete search history.

(56) References Cited

U.S. PATENT DOCUMENTS

| | | | |
|---|---|---|---|
| 4,426,564 A | 1/1984 | Steigerwald et al. | |
| 4,820,891 A | 4/1989 | Tanaka et al. | |
| 4,886,592 A | 12/1989 | Anderle et al. | |
| 5,191,302 A | 3/1993 | Rossnick | |
| 6,153,863 A | 11/2000 | Snowball | |
| 2020/0122408 A1* | 4/2020 | Greller | B29C 66/73921 |
| 2024/0316682 A1* | 9/2024 | Donohue | B23K 37/04 |

FOREIGN PATENT DOCUMENTS

WO WO 1993/004527 A1 3/1993

OTHER PUBLICATIONS

Solary Magnetic Induction Heater Kit—1000W 110V Induction Heat Bolt Removal Tool, https://www.amazon.com/Solary-Magnetic-Induction-Automotive-Flameless/dp/B0851C6Q22/ref=asc_df_B0851C6Q22/?tag=hyprod-20&linkCode=df0&hvadid=692875362841&hvgmt=&hvdev=c&bvdvcmdl=&hylocint=&hvlocphy=9019657&hytargid=pla-2281435180258&psc=1&mcid=04721351134830859c48bd3664e24324&hvocijid=117202554784055106041-B0851C6Q22-&hvexpln=73.

* cited by examiner

*Primary Examiner* — Sharidan Carrillo
(74) *Attorney, Agent, or Firm* — Dewitt LLP

(57) ABSTRACT

An end stripper that strips a polymer coating from flexible screen frame material, the end stripper including a table having a tabletop and ground engaging legs, an induction coil coupled to an induction power supply, a clamping assembly located proximate the tabletop and sized to receive a first end portion of flexible screen frame material therein. The induction coil positioned and shiftable to receive the first end portion of the flexible screen frame material therein and operable to heat the first end portion by induction thus softening a polymer coating of the flexible screen frame material. A first stripping jaw strips the polymer coating from the first end portion.

8 Claims, 11 Drawing Sheets

END STRIPPER FOR FLEXIBLE SCREEN FRAME MATERIAL

TECHNICAL FIELD

Embodiments of the invention relate generally to removable window and door screens. In particular, example embodiments of the invention relate to the manufacturing of removable window screens that include a flexible frame that is resilient and a flexible mesh material that is bonded to the flexible frame.

BACKGROUND

Fenestrations exist in buildings to permit ingress and egress, entry of fresh air and light. Screens have been used in these openings for many years to permit the entry and exit of air while excluding insects, debris, leaves and other undesired materials. Currently screens generally include a mesh material supported by a frame that holds the mesh material taut and facilitates insertion of the screen into the frame of a fenestration. For the purposes of this application, the term fenestration refers to any opening in the outside envelope of a building structure including but not limited windows and doors.

In many modern window screens a fiberglass mesh is supported in a frame. Other mesh materials commonly include nylon, polyester, bronze, stainless steel, aluminum, copper, brass and galvanized steel. Meshes made of fiberglass, nylon and polyester are generally quite flexible, while meshes that are made of stainless steel, aluminum, copper, brass and galvanized steel are relatively less flexible.

Screen frames are commonly made of rigid materials such as extruded aluminum, wood, steel or polymers. Occasionally, screens are made without a perimeter frame. In this case the screens are stretched taut over an opening often by a roller under spring tension.

More recently, other screen frames are made of flexible materials with resilient qualities. For example, some flexible screen frames are made from resilient steel that is coated with a polymer material. In many cases, the screen mesh is fused to the flexible screen frame by the application of heat which renders the polymer material of the screen frame, the screen mesh or both at least partially molten during the manufacturing of the screen. When the polymer material returns to its non-molten state the screen mesh is fused and strongly bound to the screen frame.

Such flexible screens are typically inserted into rigid fenestration frames by distorting the flexible window screen, generally by pushing inwardly on parallel rectilinear sides of the flexible window screen and then inserting the flexible window screen into grooves that surround the rigid fenestration frame on an inside of the fenestration frame. Similarly, flexible screens are generally removed by distorting the screen frame which then permits taking the screen frame out of the grooves. To facilitate this, the flexible screen frame is generally resiliently biased outwardly toward an approximately rectangular shape.

Currently, manufacturing of flexible window screen frames and flexible window screens is largely done by manual processes that are labor-intensive. These processes tend to be inefficient and time-consuming. Thus, rapid production of flexible screen frames and screens is not available. Flexible screen frames are formed from spring metal such as spring steel that is bent to the shape of the screen and so that terminal ends of the metal material abut one another. Generally, the abutting ends of the flexible screen frame are located away from corners of the frame. Usually the abutting ends of the are not at a center of a straight side of the screen frame but the joint is not precluded from being there. The spring material is coated with a polymer material such as polyvinylchloride (PVC) also referred to as vinyl. Other polymer material coatings are, of course, possible.

The abutting terminal ends of the shaped frame are welded to each other to form a closed geometric shape most commonly a rectangle or a square. Resistance welding is commonly used.

To facilitate the welding of the abutting ends of the frame, the polymer coating material must first be removed from the metal core material. Failure to remove the polymer material interferes with establishing electrical contact with the metal core of the frame material necessary for electrical welding and may result in contamination of any weld that is performed with the coating material present. Contaminated welds are often of inferior quality and may not hold up to the flexing encountered during insertion and removal of the flexible screen frame from a window or door structure.

Following welding of the abutted metal core ends it is good practice to clean the area of the weld to remove weld flash or spatter and possibly to mitigate any mushrooming of the abutted ends that may occur during the welding process.

It is also desirable to apply a new polymer coating over the stripped and welded area of the frame to mitigate corrosion and to facilitate adhesion of screen mesh in the area surrounding the weld. This is commonly accomplished by slipping a portion of heat shrink tube over the frame material prior to welding to join the abutting ends and moving the heat shrink material away from the portion to be welded until it is welded, cleaned and cooled. After the welding is performed, post weld cleaned and cooled the heat shrink tube is located to cover the previously stripped and welded portion and heat is applied to shrink it. The level of heat required to shrink the heat shrink tube is considerably less than that related to welding.

These processes are typically manually performed.

Accordingly, there is still room for improvement in the manufacturing of flexible window screens.

SUMMARY OF THE INVENTION

Example embodiments of the invention improve on many of the above discussed deficiencies of the prior art.

According to an example embodiment, the invention includes A table having ground engaging legs and a top. The table further includes an induction power supply and controls for the induction power supply. The top of the table further includes a clamping assembly configured to grip alternate ends of flexible screen frame material. According to an example embodiment, an end stripper according to the invention further includes a movable induction heating and end stripping assembly.

The induction power supply is operably coupled to an induction coil associated with the movable induction heating and end stripping assembly. The induction power supply is also operably coupled to the controls for the induction power supply. The induction coil is sized and shaped to receive an end of a portion of flexible screen frame material therein. According to an example embodiment of the invention, the induction coil is accessible from both ends to receive the end of the portion of flexible screen frame material. According to the example embodiment, the induction coil is located between two end stripping dies. According to other example embodiments, different configurations are possible. Multiple induction heating coils may be utilized and one or more stripping dies may be utilized. Induction heating coils may be positioned between stripping dies or outside of the stripping dies. The end stripping dies are configured to closely conform to the size and shape of the metal core of the flexible screen frame material when the dies are in a closed configuration and to receive the metal core and polymer coating of the flexible screen frame material therein.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
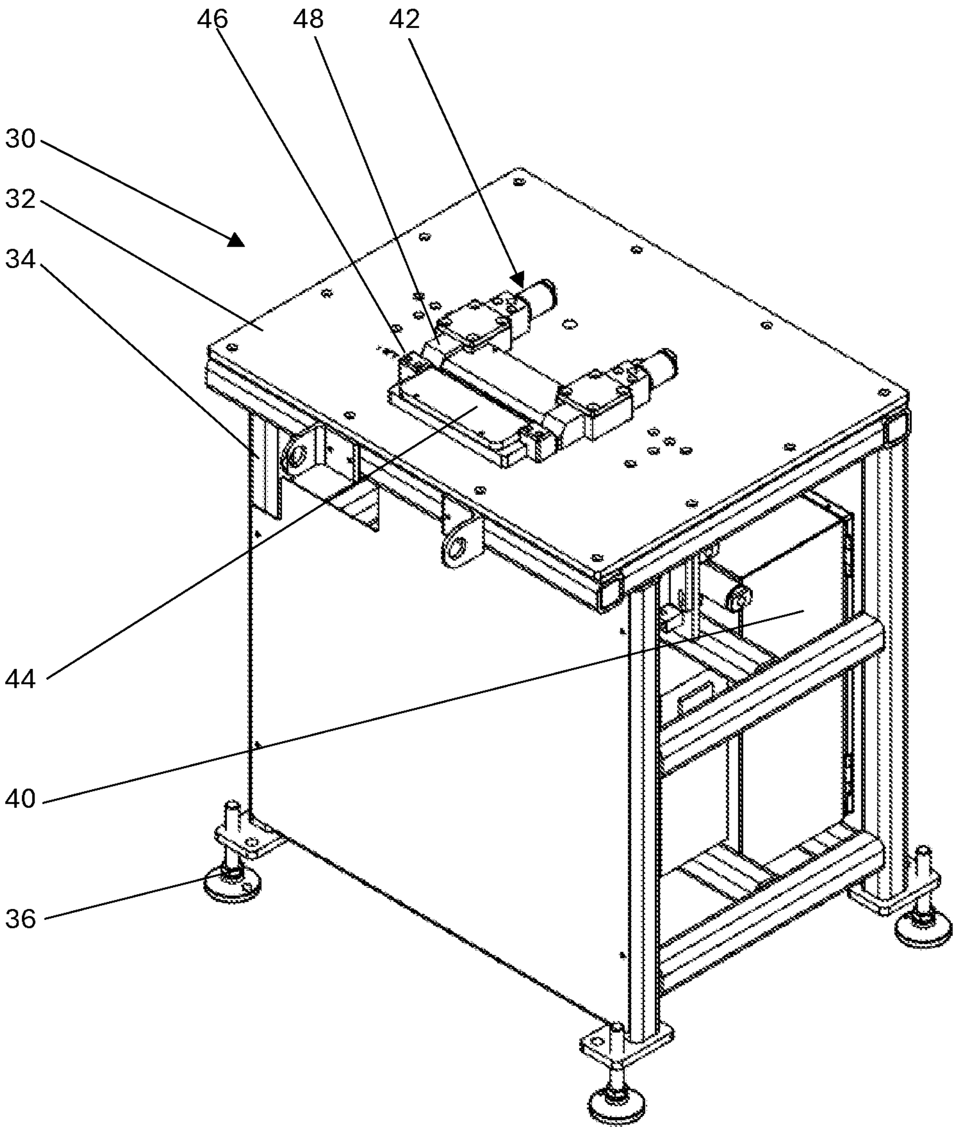
FIG. 1 is a perspective view of a screen frame stripper according to an example embodiment of the invention.
Figure 2:
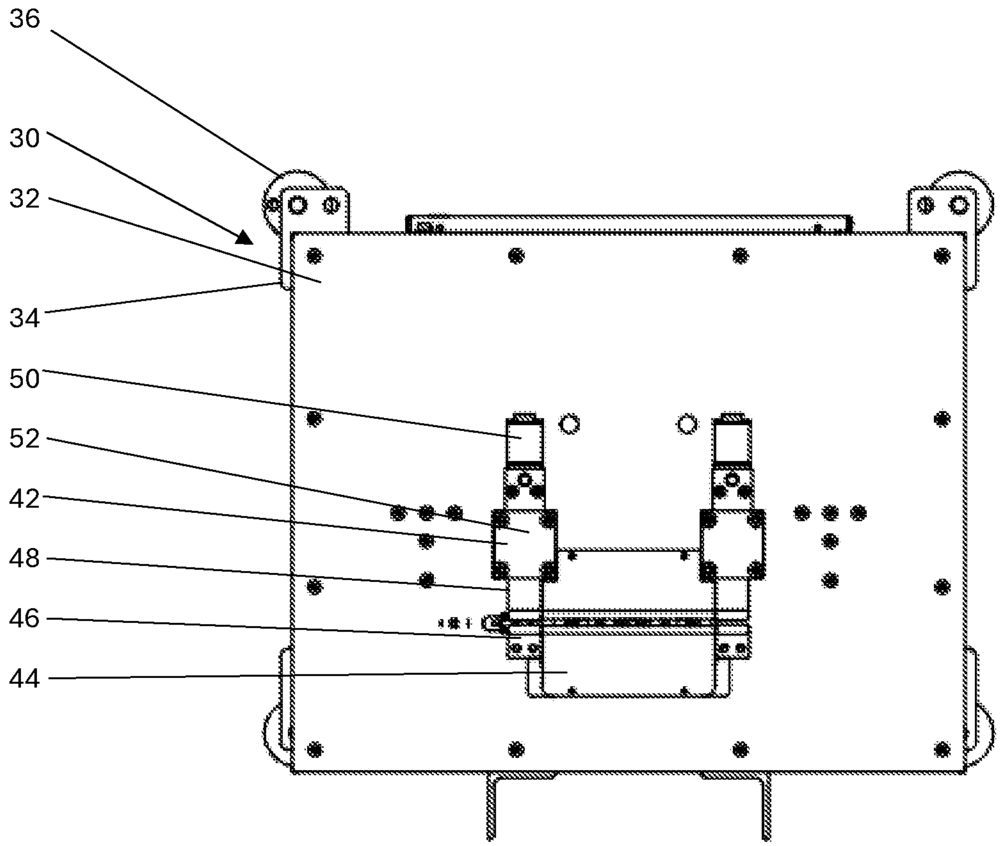
FIG. 2 is a top plan view of the screen frame stripper depicted in FIG. 1.
Figure 3:
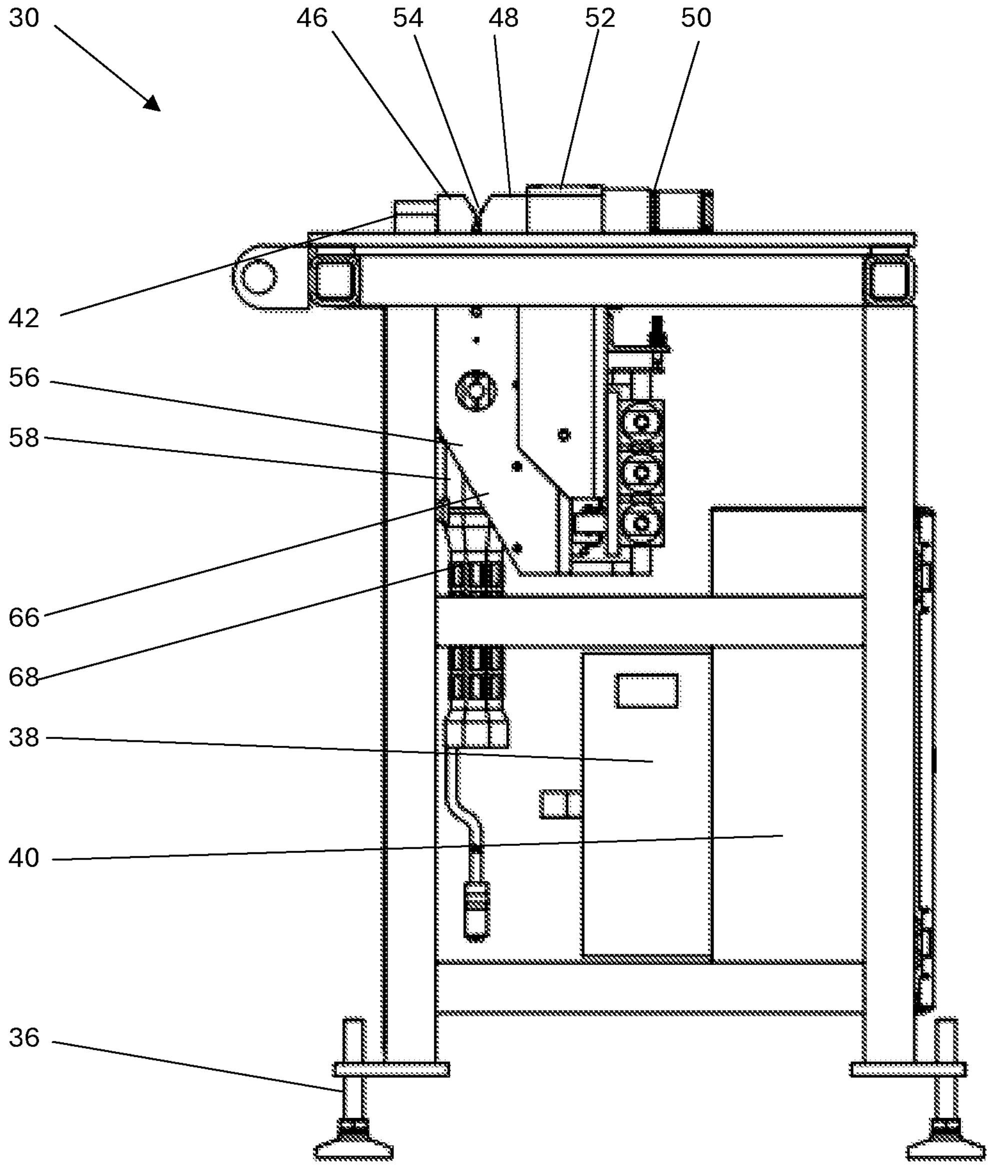
FIG. 3 is a side elevational view of the screen frame stripper depicted in FIG. 1.
Figure 4:
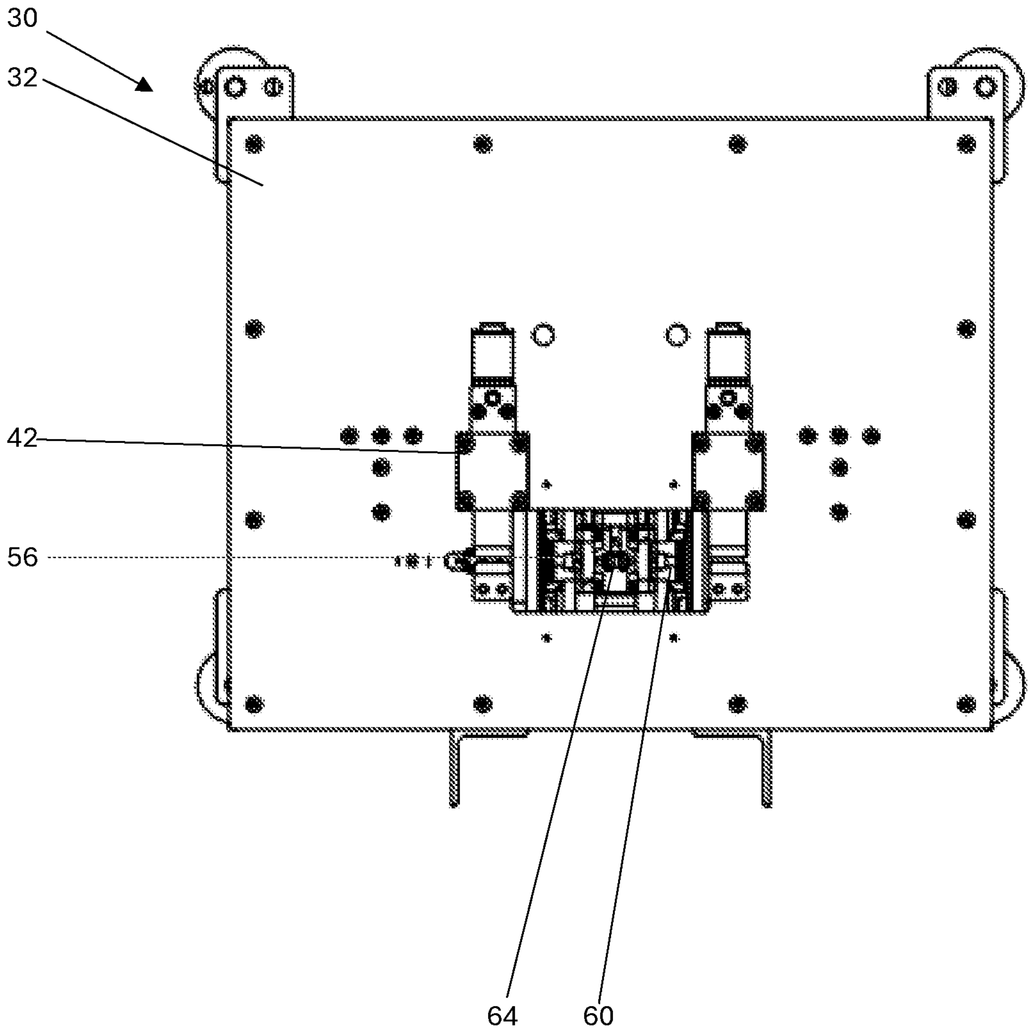
FIG. 4 is a top plan view of the screen frame stripper depicted in FIG. 1 with an induction heating and stripping head elevated.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Referring to FIGS. 1-4, with particular attention to FIG. 1, screen frame stripper 30 generally includes table 32, legs 34, levelers 36, induction power supply 38, controller 40, clamp assembly 42 and induction heating and stripping head cover 44.

Table 32 is supported on legs 34 which optionally include levelers 36 at bottom of legs 34. Induction power supply 38 and controller 40 are conveniently positioned beneath table 32 and between legs 34 but may be otherwise located. Clamp assembly 42 is located on top of table 32 and straddles induction heating and stripping head cover 44 when stripping head cover 44 is in a closed orientation.

Clamp assembly 42 is located on the top of table 32 and generally includes fixed jaws 46, movable jaws 48, linear actuators 50 and movable jaw supports 52. Movable jaws 48 and linear actuators 50 are secured to table 32 by movable jaw support 52. Fixed jaw 46 is secured to table 32. Fixed jaw 46 and movable jaw 48 can be made of a non-marring material such as nylon. Fixed jaw 46 and movable jaw 48 each present upper bevel 54. Linear actuator 50 is coupled to movable jaw 48 and moves movable jaw 48 between a position abutting fixed jaw 46 and a position remote from fixed jaw 46. Linear actuator 50 may be actuated by hydraulic power, pneumatic power or electrical power. Actuation of linear actuator 50 is controlled by controller 40.

Induction heating and stripping head cover 44 is shiftable between a deployed orientation and a retracted orientation. Induction heating and stripping head cover 44 is depicted in a deployed orientation in FIGS. 1 and 2 and in a retracted orientation in FIGS. 3 and 4. In the deployed orientation induction heating and stripping head cover 44 covers induction heating and stripping head 56.

Figure 5:
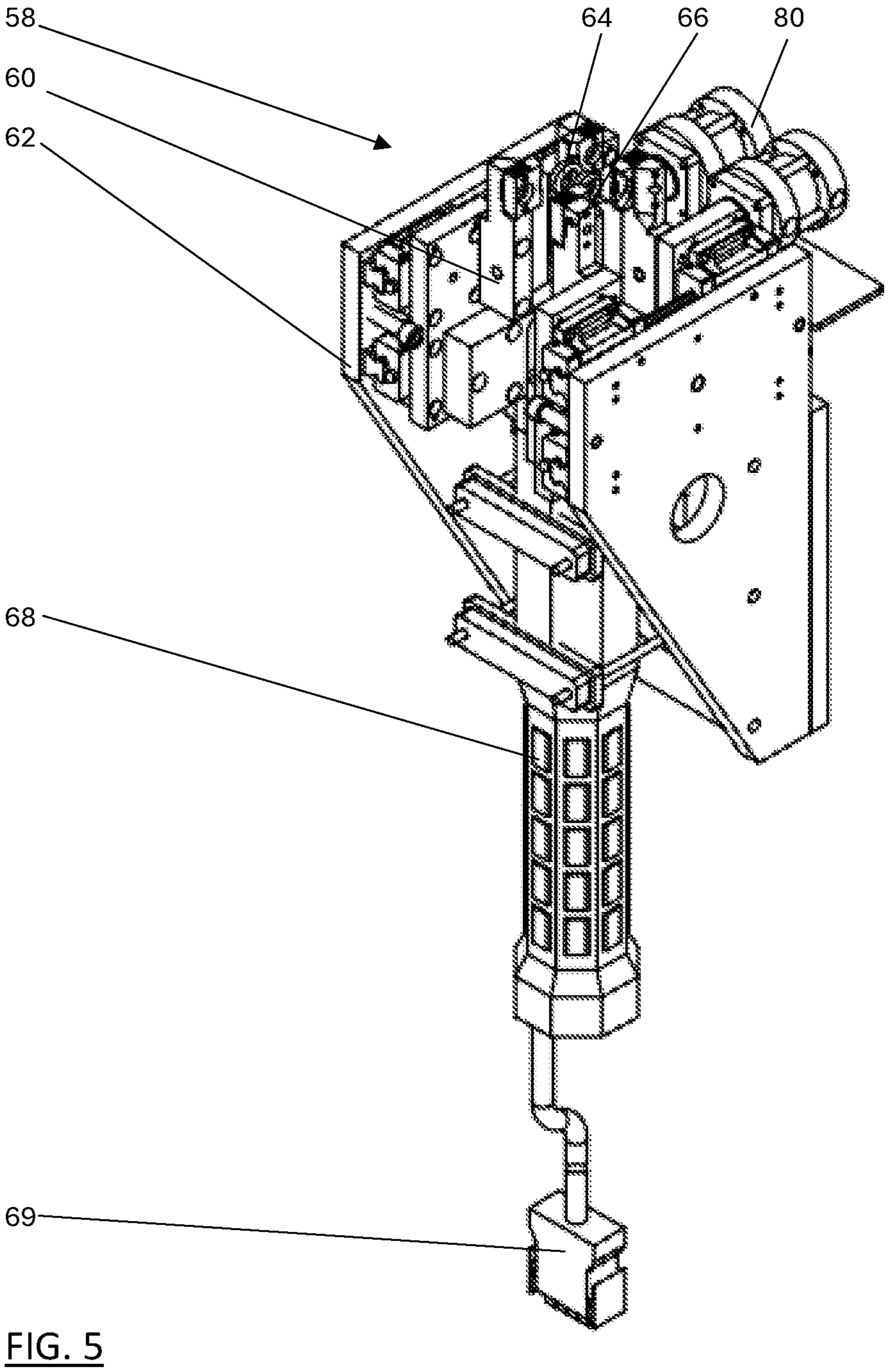
FIG. 5 is a perspective view of an induction heating and stripping head according to an example embodiment of the invention.
Figure 6:
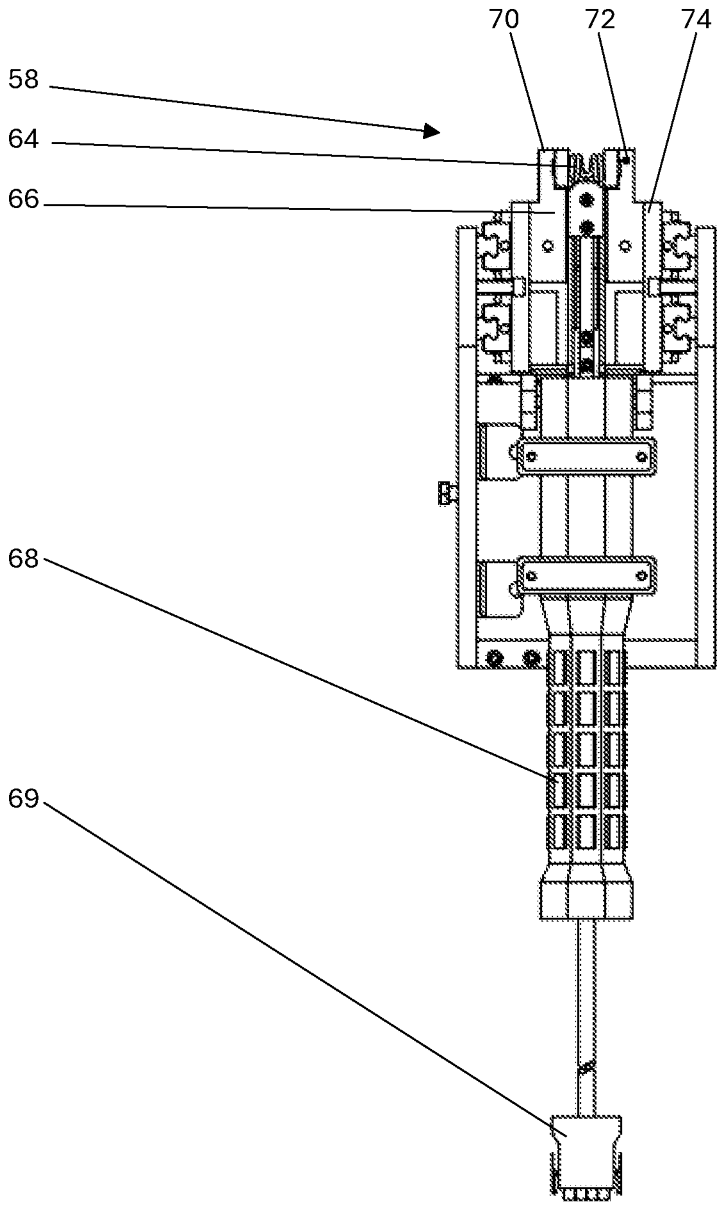
FIG. 6 is a front elevational view of the induction heating and stripping head depicted in FIG. 5.

Induction heating and stripping head 56 is depicted, for example, in FIGS. 5 and 6 and generally includes induction heating coil assembly 58, stripping jaws assembly 60 and supporting structures 62. In the depicted embodiment, induction heating coil assembly 58 is centrally located and is surrounded by stripping jaw assembly 60.

Induction heating coil assembly 58 generally includes induction coil 64, induction coil support 66 and induction power module 68. Induction coil 64 is a generally helical structure with a radius adapted to receive screen frame material therein while being close enough to the interior of induction coil 64 to appropriately transfer magnetic energy to the metallic screen frame material to induce rapid heating. Induction power module 68 further includes induction electrical connector 70. Induction electrical connector 69 is adapted to electrically couple induction heating coil assembly 58 to induction power supply as a source of current controlled by controller 40. All the structures are supported by supporting structure 62 whereby they are coupled to table 32.

Figure 7:
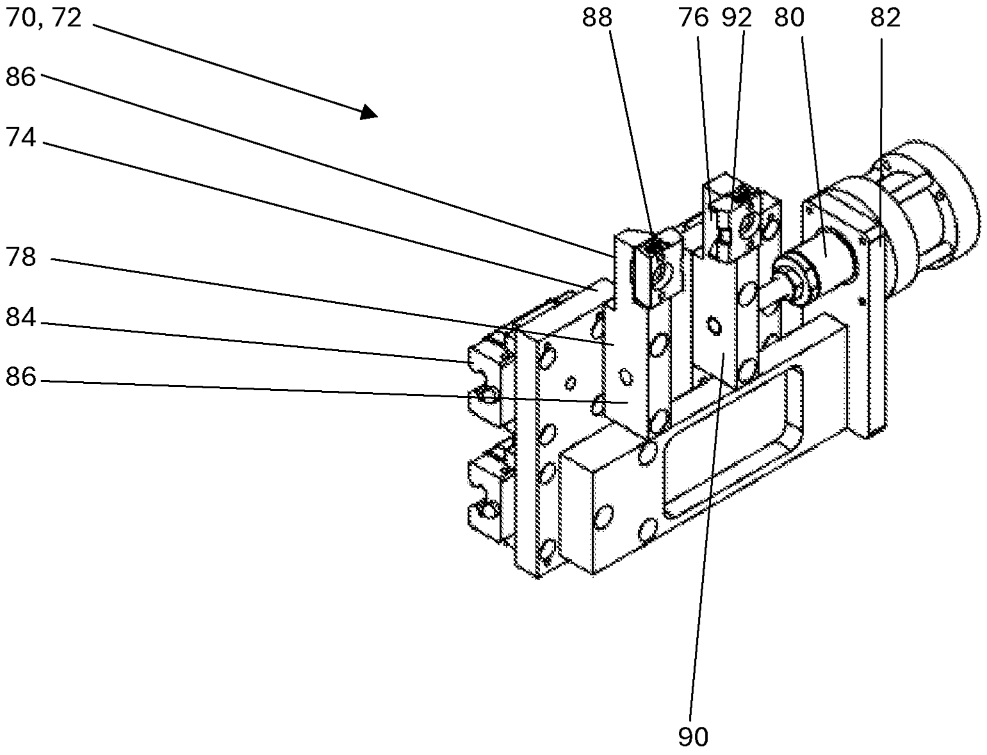
FIG. 7 is a perspective view of a stripping mechanism including stripping dies according to an example embodiment of the invention.
Figure 8:
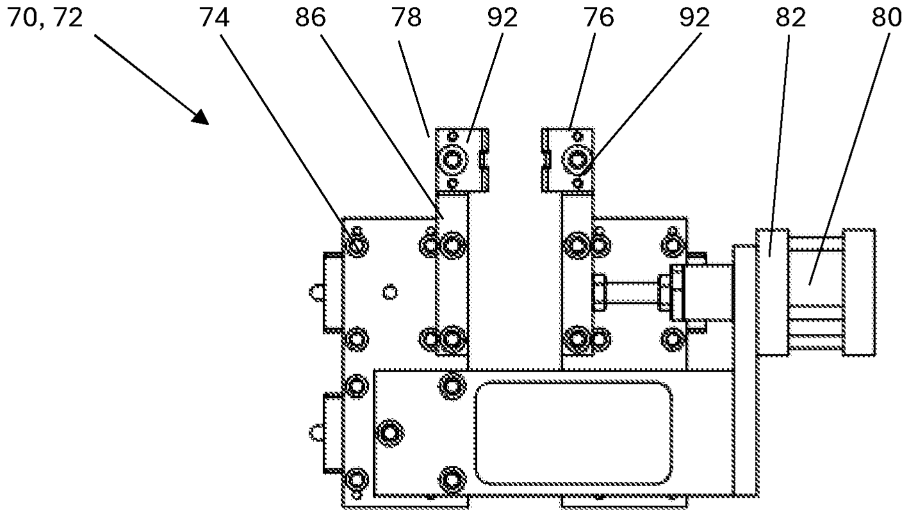
FIG. 8 is an elevational view of the stripping mechanism depicted in FIG. 7.

Referring particularly to FIGS. 6, 7 and 8, stripping jaws assembly 60, according to the depicted example embodiment, generally includes first jaw module 70 and second jaw module 72. In the depicted embodiment, first jaw module 70 and second jaw module 72 are located on opposing sides of induction coil 64 and are mirror images of one another. As will be discussed below other arrangements of the stripping jaws assembly 60 and the induction coil 64 are possible.

First jaw module 70 generally includes jaw supporting frame 74, movable stripping jaw 76, fixed stripping jaw 78, movable jaw actuator 80, actuator support 82 and module sliders 84. Jaw supporting frame 74 is immovably secured to fixed stripping jaw 78. Movable stripping jaw 76 is movably coupled to jaw supporting frame 74. Movable jaw actuator 80 is fixedly coupled to actuator support 82 and also to movable stripping jaw 76. Movable jaw actuator 80 is shiftable between an extended position and a retracted position thereby moving movable stripping jaw 76 from a location remote from fixed stripping jaw 78 and a location in contact with fixed stripping jaw 78. Fixed stripping jaw 78 includes fixed supporting member 86 and fixed cutting member 88. Movable stripping jaw 76 includes movable supporting member 90 and movable cutting member 92. Fixed cutting member 88 and movable cutting member 92 are similar structures and each include cutting member body 94 defining half aperture 96. When fixed cutting member 88 and movable cutting member 92 are brought together the two half apertures have a shape closely conforming to the metallic portion of flexible screen frame material. Edges of half apertures 96 are sharpened to facilitate stripping of a polymer coating of screen frame material. Cutting member body 94 is made of a hard cutting material such as hardened steel and defines appropriate openings, other structures or both to facilitate attachment to fixed supporting member 86 or movable supporting member 90 by, for example, fasteners.

Movable jaw actuator 80 can be any linear actuator known to those skilled in the art. For example, movable jaw actuator 80 can be pneumatically, hydraulically or electrically actuated.

FIGS. 9-12 schematically depict a number of example orientations in which induction coil 64 and cutting member bodies 94 can be relatively oriented according to example embodiments of the invention to facilitate heating and stripping of polymer coating from screen frame material.

Figure 9:
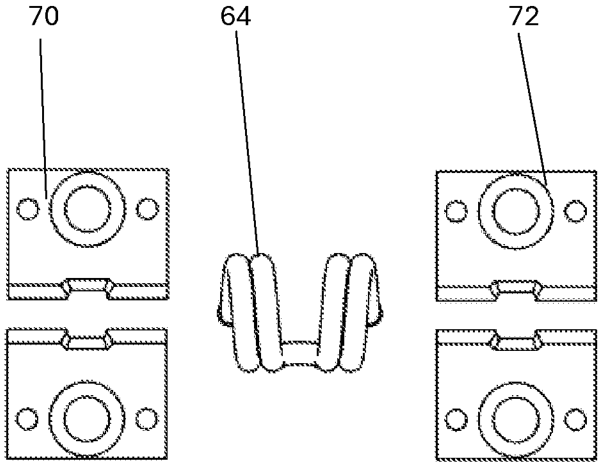
FIG. 9 is a schematic depiction a relative orientation of an induction heating coil and two sets of stripping dies according to an example embodiment of the invention.

Referring to FIG. 9, according to an example embodiment two sets of cutting member bodies 94 are located on opposing sides of a single induction coil 64.

Figure 10:
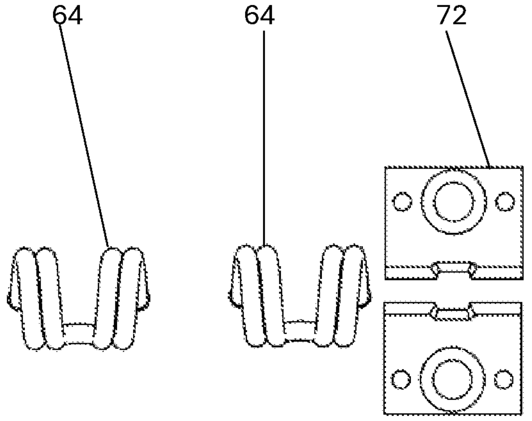
FIG. 10 is a schematic depiction a relative orientation of two induction heating coils and two sets of stripping dies with the stripping dies positioned outside of the induction heating coils according to an example embodiment of the invention.

Referring to FIG. 10, two sets of induction coils 64 are located between two sets of cutting member bodies 94.

Figure 11:
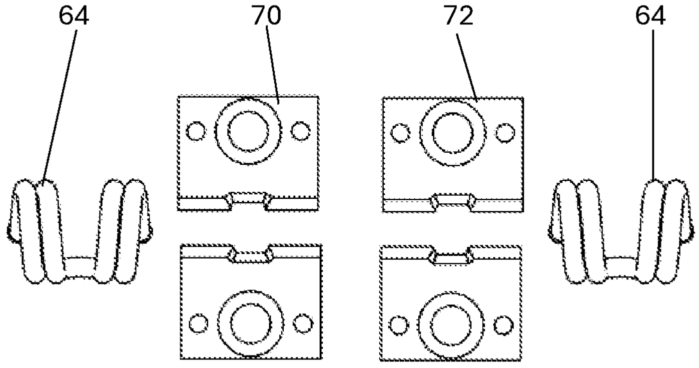
FIG. 11 is a schematic depiction a relative orientation of two induction heating coils and two sets of stripping dies with the stripping dies positioned between the induction heating coils according to an example embodiment of the invention.

With reference to FIG. 11, two sets of induction coils 64 may be located on opposing sides of two sets of cutting member bodies 94.

Figure 12:
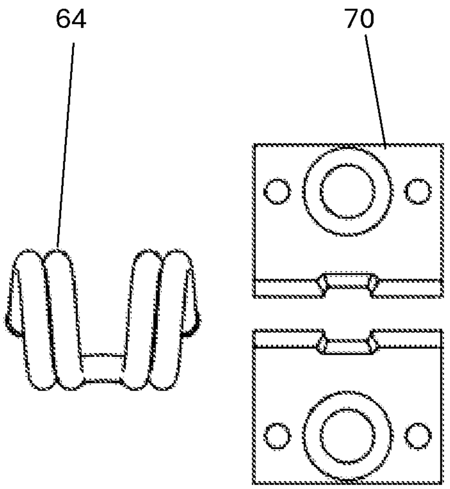
FIG. 12 is a schematic depiction a relative orientation of one induction heating coil and one set of stripping dies with the set of stripping dies positioned adjacent the induction heating coil according to an example embodiment of the invention.
Figure 13:
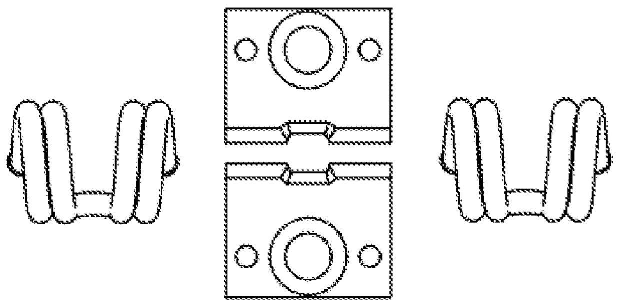
FIG. 13 is a schematic depiction a relative orientation of two induction heating coils and one set of stripping dies with the set of stripping dies positioned adjacent and between the induction heating coil according to an example embodiment of the invention.

Referring to FIG. 12, a single induction coil 64 may be located adjacent to a single set of cutting member bodies 94.

In operation, an operator places ends of screen frame material on table 32 of screen frame stripper 30. The operator places ends of the screen frame material inside opened clamp assembly 42 and between movable jaw 48 and fixed jaw 46. The operator then actuates clamp assembly 42 to grip the two ends of screen frame material therein after abutting the ends of the screen frame material against the exterior of stripping jaws assembly 60. The operator then activates induction heating and stripping head 56.

In an example embodiment, at the starting state of screen frame stripper 30, clamp assembly 42 is in an open orientation, Stripping jaws assembly 60 and induction coil 64 are in a centered orientation. Stripping jaws assembly 60 opens stripping jaws by action of movable jaw actuator 80. Induction heating and stripping head 56 then moves to one end of its travel and so that a first end of flexible screen frame material is encircled by induction coil 64. Induction coil 64 is then activated which by application of magnetic field heats the metal core of the screen frame material to a temperature sufficient to render the polymer coating at least partially molten. Induction heating and stripping head 56 then moves to a position where fixed jaw 46 and movable jaw 48 on either side of the screen frame material to be stripped. Movable jaw actuator 80 then advances movable stripping jaw 76 into contact with fixed stripping jaw 78 with screen frame material gripped therebetween. Induction heating and stripping head 56 then moves in the opposite direction thereby stripping the polymer coating from the screen frame material. Induction heating and stripping head 56 continues to move in the opposite direction until a second end of the screen frame material is surrounded by induction coil 64. Induction coil 64 is activated to heat the second end of the screen frame material. Induction heating and stripping head 56 then moves to a position where second set of fixed jaw 46 and movable jaw 48 are located on either side of the second portion of screen frame material to be stripped. Second movable jaw actuator 80 moves movable stripping jaw 76 toward and into contact with fixed stripping jaw 78 gripping the screen frame material therebetween. Induction heating and stripping head 56 then moves in an appropriate direction to strip the molten heated semi molten polymer material from the second end of the screen frame material. Induction heating and stripping had 56 then travels to a centrally located resting position. Clamping assembly 42 is released and the operator removes the screen frame material from table 32.

This description is based on the arrangement of induction heating and stripping head 56 depicted in, for example FIGS. 5 and 9. A different sequence of movements can be applied to arrangements depicted in FIGS. 10 through 13 to accomplish desired stripping results.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A method of stripping a polymer coating from a flexible screen frame material, the method comprising:

inserting a first end portion of the flexible screen frame material comprising a polymer coating into a clamp assembly so that the first end portion of the flexible screen frame material abuts a first stripping jaw;

engaging the clamp assembly to fix the first end portion in location;

moving an induction coil to encompass the first end portion of the flexible screen frame material;

energizing the induction coil thereby heating the first end portion of the flexible screen frame material;

shifting the induction coil and the first stripping jaw to a first position wherein the stripping jaw encompasses the first end portion of the flexible screen frame material;

closing the first stripping jaw;

shifting the induction coil and the first stripping jaw in a first opposing direction thus stripping the polymer coating of the flexible screen frame material;

opening the first stripping jaw; and releasing the clamp assembly to facilitate removal of the first end portion of the flexible screen frame material.

2. The method as claimed in claim 1, further comprising:

simultaneously with shifting the induction coil and first stripping jaw in the first opposing direction, shifting the induction coil to surround a second end portion of the flexible screen frame material;

energizing the induction coil again thereby heating the second end portion of the flexible screen frame material;

shifting the induction coil and a second stripping jaw to a position wherein the second stripping jaw encompasses the second end portion of the flexible screen frame material;

closing the second stripping jaw;

shifting the induction coil and the second stripping jaw in a second opposing direction thus stripping the polymer coating from the second end portion of the flexible screen frame material;

returning the induction coil to an initial position; and releasing the clamp assembly.

3. The method as claimed in claim 1, further comprising opening an induction heating and stripping head cover and closing the induction heating and stripping head cover.

4. The method as claimed in claim 1, further comprising activating a first linear actuator to close the first stripping jaw.

5. A method of stripping a polymer coating from a flexible screen frame material, the method comprising:

inserting a first end portion of the flexible screen frame material comprising a polymer coating into a clamp assembly while the flexible screen frame material is supported on a horizontal table so that the first end portion of the flexible screen frame material abuts a first stripping jaw extending upwardly through an opening in the table;

engaging the clamp assembly to fix the first end portion in location;

encompassing the first end portion of the flexible screen frame material in an induction coil;

energizing the induction coil thereby heating the first end portion of the flexible screen frame material thus rendering the polymer coating softened or at least partially molten;

shifting the induction coil and the first stripping jaw to a first position wherein the first stripping jaw encompasses the first end portion of the flexible screen frame material;

closing the first stripping jaw;

shifting the induction coil and the first stripping jaw in a first opposing direction thus stripping the polymer coating of the flexible screen frame material;

opening the first stripping jaw; and releasing the clamp assembly to facilitate removal of the first end portion of the flexible screen frame material.

6. The method as claimed in claim 5, further comprising:

inserting a second end portion of the flexible screen frame material into the clamp assembly while the flexible screen frame material is supported on the horizontal table so that the second end portion of the flexible screen frame material abuts a second stripping jaw extending upwardly through the opening in the table;

simultaneously with shifting the induction coil and the first stripping jaw in the first opposing direction, encompassing a second end portion of the flexible screen frame material with the induction coil;

energizing the induction coil again thereby heating the second end portion of the flexible screen frame material thus rendering the polymer coating softened or at least partially molten;

shifting the induction coil and the second stripping jaw to a position wherein the stripping jaw encompasses the second end portion of the flexible screen frame material;

closing the second stripping jaw;

shifting the induction coil and the second stripping jaw in a second opposing direction thus stripping the polymer coating from the second end portion of the flexible screen frame material;

returning the induction coil to an initial position; and releasing the clamp assembly.

7. The method as claimed in claim 5, further comprising opening an induction heating and stripping head cover and closing the induction heating and stripping head cover.

8. The method as claimed in claim 5, further comprising activating a first linear actuator to close the first stripping jaw.

* * * * *